United States Patent Office 3,376,113
Patented Apr. 2, 1968

3,376,113
CATALYTIC HYDROLYSIS OF PHOSGENE
Ludo K. Frevel, Midland, and Leonard J. Kressley, Saginaw, Mich., assignors to The Dow Chemical Company, Midland, Mich., a corporation of Delaware
No Drawing. Filed May 13, 1965, Ser. No. 455,656
5 Claims. (Cl. 23—219)

ABSTRACT OF THE DISCLOSURE

This invention relates to a vapor phase process for the catalytic hydrolysis of phosgene. The hydrolysis is accomplished by passing phosgene through a bed of activated alumina at a temperature of between about 95° C. and about 190° C. in the presence of water to convert the phosgene to HCl and $CO_2$. This process finds particular utility in removing phosgene from gaseous streams which contain a relatively small proportion thereof.

---

This invention is concerned with a new and improved process for catalytically hydrolyzing phosgene to HCl and $CO_2$, and is more particularly related to the removal of phosgene from other gases by catalytically hydrolyzing it in the presence of a particular form of activated alumina.

Phosgene is a highly poisonous gas which frequently occurs as a contaminant in other gas streams, particularly in streams of chlorine or chlorinated hydrocarbons. The presence of phosgene in chlorinated solvents, even in very small quantities, constitutes a serious health hazard. The need has long existed for a method whereby phosgene could be removed from such streams continuously and with a minimum of loss or modification of the main component of the gas stream. Likewise, the presence of phosgene in gaseous chlorine streams has heretofore presented a serious removal problem.

It is, therefore, a principal object of this invention to provide a method for catalytically hydrolyzing phosgene. It is a further object to provide a process for the removal of phosgene from gas streams containing the same by the catalytic hydrolysis thereof. Still further objects of this invention are to provide a method whereby phosgene may be continuously, rapidly, and quantitatively converted to HCl and $CO_2$. Other objects and advantages of this invention will become apparent from the following detailed description.

It has now been discovered that phosgene may be catalytically hydrolyzed to $CO_2$ and HCl in the presence of activated alumina at a temperature of from about 95 to 190° C. Such catalytic hydrolysis takes place quantitatively under these conditions and may be applied either to pure phosgene, gas streams containing large quantities of phosgene, or even to gas streams containing only trace quantities of phosgene.

The catalytic hydrolysis of phosgene in the vapor phase has been found to take place in the presence of activated alumina within the relatively narrow temperature range of 95° to 190° C. When the temperature of the catalyst bed is substantially below 95° C., little or no hydrolysis of the phosgene takes place. If the temperature of the catalyst bed is increased to substantially above 190° C., there is likewise a rapid decrease in the extent of hydrolysis of the phosgene. While the technical explanation for the efficiency of this particular temperature range is not completely understood, experimental results show the temperature range to be critical for this reaction. While one mole of water will theoretically hydrolyze one mole of phosgene to HCl and $CO_2$, it is sometimes desirable to employ an excess of phosgene to remove water to 1-2 p.p.m. range.

By "active alumina" catalyst as used herein is meant a high surface area (about 20 to 300 or more square meters per gram) alkaline active alumina ($Al_2O_3$) composition, said alkaline active alumina composition having from about one half to about three percent by weight sodium and/or potassium atoms affixed thereto. Such catalyst may be prepared by numerous methods. Illustratively, an aqueous solution containing aluminum salts may be treated with a dilute aqueous alkali solution containing either sodium or potassium ions until precipitation of the aluminum occurs. Thereafter the precipitated alumina gel may be dried and roasted at temperatures of 250 to about 500° C. for several hours to insure complete dehydration and activation. This and similar processes for the preparation and activation of alumina are well known in the art.

The catalytic conversion process as herein defined may be applied to phosgene alone or the mixtures of phosgene with other gases. Such gases include air, the inert gases, halogens, hydrocarbons, chlorinated hydrocarbons, and the like. Phosgene is, however, more prevalently found usually in relatively dilute concentrations, in air, chlorine, or chlorinated hydrocarbons and it is the removal from these gas streams in which this process finds its greatest utility.

According to the present invention the phosgene, or gas containing phosgene, is passed with water vapor through a bed of activated alumina heated to a temperature of from about 95 to about 190° C. and at a space velocity (calculated based on a gas at standard conditions of temperature and pressure) of from about 100 v./v./hr. to 500 v./v./hr. The length of the catalyst bed and the flow rate of the phosgene or phosgene-gas mixture passing therethrough may be adjusted to provide a contact time within the activated alumina catalyst bed of from about 0.6 minute to 0.01 minute. This will provide quantitative conversion of the phosgene present. The hydrolysis products of the phosgene will be HCl and $CO_2$ and may therefore be removed by scrubbing with a strong base such as caustic or may be removed by any other appropriate means depending on the characteristics of the other gaseous component.

The system may be made small and efficient and may be used to continuously purify any given stream of gas. Extended use of the activated alumina catalyst has shown that the catalyst life is indefinite without noticeable loss of activity.

The following examples are given to more clearly describe the process, but are not to be construed as limiting the invention thereto.

EXAMPLE 1

A cylindrical catalyst bed was prepared employing 8 mesh (U.S. Standard Sieve Series) active alumina as hereinbefore defined, said bed having a height of 9 cm. and a diameter of 1.3 cm. (14 ml. volume). The bed and the feed stream entering the bed were maintained at a temperature of 100° C. A gaseous mixture of nitrogen, phosgene, and water vapor was then fed through the catalyst bed. The flow rates were 850 milliliters per minute of nitrogen, 0.6 milliliter per minute of phosgene and 1.2 milliliters per minute of water vapor making a gas stream containing about 70 p.p.m. phosgene and 140 p.p.m. $H_2O$. As the gases flowed from the reactor, a portion of the effluent stream was passed through a drying tube containing anhydrous calcium sulfate and then to a 10 centimeter infrared gas cell in an infrared spectrometer (with 1.3 meter path length) to monitor continuously the phosgene content of the gas. The flow was continued for 120 hours, and no phosgene was detected in the off-gas from the reactor.

An additional portion of the reactor effluent stream was passed through a water trap, then through an anhydrous calcium sulfate drying tube and finally through a wet test meter. Titration of the water and weighing of the drying tube showed HCl and $CO_2$ to be present in a 2 to 1 ratio. The temperature was then lowered to a temperature range of 84 to 87° C. and maintained there for 50 hours. During this period of time 10 to 40 parts per million of phosgene were continuously observed by the infrared spectrometer. The temperature was then raised to 135° C. At this temperature no phosgene was found in the effluent gas. The temperature was then raised to 140° C. At this temperature the infrared spectrometer showed 10–20 parts per million phosgene in the effluent gas.

EXAMPLE 2

Following the method and using the equipment of Example 1, a gas mixture of chlorine, phosgene and water were fed to the same catalyst bed at a rate of 300 ml./minute (1 atm., 250° C.). The chlorine contained 1,000 parts per million phosgene and 2,000 parts per million water. As in Example 1, at a temperature of 84 to 87° C. the effluent gas from the reactor contained 10–20 parts per million phosgene. At 100° C. and at 190° C. no phosgene was detected in the reactor off-gas. However, at 195° C. 10 parts per million phosgene were detected in the effluent gas from the reactor.

In the same manner phosgene may be removed from chlorinated hydrocarbons such as trichloroethylene and perchloroethylene.

We claim:

1. A vapor phase process for the catalytic hydrolysis of phosgene which comprises passing phosgene through a bed of alkaline activated alumina catalyst having from about 0.5 to about 3.0 percent by weight of alkali atoms selected from the group consisting of sodium and potassium affixed thereon at a temperature of from about 95 to about 190° C. in the presence of water vapor to convert said phosgene to HCl and $CO_2$.

2. A vapor phase process for the catalytic hydrolysis of phosgene which comprises passing phosgene through a bed of alkaline activated alumina catalyst having from about 0.5 to about 3.0 percent by weight of alkali atoms selected from the group consisting of sodium and potassium affixed thereon having a surface area between 20 and 300 m.$^2$/g. at a temperature of from about 95 to 190° C. in the presence of at least a stoichiometric amount of water vapor to convert said phosgene to HCl and $CO_2$.

3. A vapor phase process for the catalytic hydrolysis of phosgene from a phosgene-containing gas stream which comprises passing said phosgene-containing gas stream through a bed of alkaline activated alumina catalyst having from about 0.5 to about 3.0 percent by weight of alkali atoms selected from the group consisting of sodium and potassium affixed thereon having a surface area of between 20 and 300 m.$^2$/g. at a temperature of from about 95 to 190° C., in the presence of at least a stoichiometric amount of water vapor to convert said phosgene to HCl and $CO_2$.

4. The process of claim 3 wherein the phosgene-containing gas stream comprises a chlorinated hydrocarbon.

5. The process of claim 3 wherein the phosgene-containing gas stream comprises chlorine.

References Cited

UNITED STATES PATENTS

| | | | |
|---|---|---|---|
| 2,149,039 | 2/1939 | Benning et al. | 23—21 X |
| 2,773,898 | 12/1956 | Brinkmann et al. | 23—21 X |
| 3,058,800 | 10/1962 | Frevel et al. | 23—21 |
| 2,444,289 | 6/1948 | Gorin et al. | |
| 2,786,816 | 3/1957 | Guerin | 23—219 X |
| 2,832,670 | 4/1958 | Wollthan | 23—154 |
| 3,142,535 | 7/1964 | Christoph | 23—154 |

OSCAR R. VERTIZ, *Primary Examiner.*

EDWARD STERN, *Examiner.*